United States Patent [19]

Schnoor et al.

[11] Patent Number: 5,333,748
[45] Date of Patent: Aug. 2, 1994

[54] CONTAINER DOOR FOR AN OXYGEN SUPPLY UNIT

[75] Inventors: Christian Schnoor, Lübeck; Roderich Thometschek, Stockelsdorf; Wolfgang Rittner, Bad Schwartau, all of Fed. Rep. of Germany

[73] Assignee: Dragerwerk AG, Lubeck, Fed. Rep. of Germany

[21] Appl. No.: 986,444

[22] Filed: Dec. 4, 1992

[30] Foreign Application Priority Data

Dec. 6, 1991 [DE] Fed. Rep. of Germany ....... 4140264

[51] Int. Cl.$^5$ ............................................ B65D 43/14
[52] U.S. Cl. .................................................. 220/343
[58] Field of Search ................. 49/381, 397, 398, 402, 49/501; 52/792, 795, 801, 802, 811; 220/425, 4.23, 342, 343, 908

[56] References Cited

U.S. PATENT DOCUMENTS

| | | |
|---|---|---|
| 1,200,516 | 10/1916 | Ohnstrand ............................ 52/792 |
| 1,417,664 | 5/1922 | Garlinghouse .................... 52/801 X |
| 2,526,596 | 10/1950 | Williamson ........................ 220/343 |
| 3,364,298 | 1/1968 | Peters ............................... 49/501 X |
| 4,158,424 | 6/1979 | Carmack ............................ 220/343 |
| 4,300,315 | 11/1981 | Holzwarth .......................... 49/501 |
| 4,748,789 | 6/1988 | Hedley ............................... 52/792 |
| 4,840,171 | 6/1989 | Röhling . | |
| 5,036,999 | 8/1991 | Bitsch ............................ 220/908 X |
| 5,124,191 | 6/1992 | Seksaria ........................... 52/792 X |

Primary Examiner—Peter M. Cuomo
Assistant Examiner—Jerry Redman
Attorney, Agent, or Firm—McGlew & Tuttle

[57] ABSTRACT

A container door (2) pivotable around a hinge (3) for closing a container for an oxygen supply unit of an airplane is provided with high rigidity to warping at the lowest possible weight. To accomplish this task, the container door (2) is provided with a profile-like reinforcing element (8) extending over at least part of the door edge (7) and with webs (9) connecting the door edges (7), which have fastening structure (11, 12, 13, 15) on the container door (2) and/or the door edge (7).

8 Claims, 3 Drawing Sheets

CONTAINER DOOR FOR AN OXYGEN SUPPLY UNIT

FIELD OF THE INVENTION

The present invention pertains to a container door pivotable around a hinge for closing a container of an oxygen supply unit in an aircraft, with a container door edge folded in the direction of the container and with a locking mechanism engaging the container from the container door.

BACKGROUND OF THE INVENTION

A container with an oxygen supply unit for installation in an aircraft has become known from U.S. Pat. No. 4,840,171 (corresponding to DE-A1 37,19,427). Such oxygen supply units are arranged in the ceiling structures in the passenger space of aircraft and seine to supply the passengers with the oxygen necessary for respiration in the case of need. The oxygen supply unit consists of a container, in which oxygen masks and an oxygen generator are arranged. A container door is provided pivotable around a hinge, which serves to close the container and has, for this purpose, a locking part which engages the container and is arranged on a holding plate. The container door has an edge, which is folded in the direction of the container and lies flatly on the container in the closed position.

One disadvantage of the prior-art container door is the fact that it has no particular rigidity against warping, as a result of which the cooperation of the locking part on the container door with the corresponding counterpart on the container may be impaired. If, for example, the container door is warped, the locking part will be jammed in the container, and it may happen that the container door will not open in the case of need.

SUMMARY AND OBJECTS OF THE INVENTION

The primary object of the present invention is to improve a container door such that it will have a high rigidity against warping at the lowest possible weight.

This task is accomplished by providing the container door with a profile-like reinforcing element, which extends around at least part of the door edge and has fastening means on the container door and/or the container edge.

The advantage of the present invention is essentially the fact that the container door is provided with a profile-like reinforcing element, which extends around at least part of the door edge and thereby reinforces the container door. Since the door edge is already at right angles to the container door, it is advantageous to design the reinforcing element such that it forms a rectangular hollow profile together with the door edge and the container door. The reinforcing element may be designed as a one-piece molding, which is placed into the container door and is connected by fastening means to both the door edge and the flat surface of the container door. The fastening means may be, e.g., spot welding. It is also possible to provide such a container door with reinforcing elements over some parts only by arranging the reinforcing elements only in the corners of the container door.

The reinforcing element advantageously has individual rectangular, profile-like webs which connect at least the door edges and have fastening means on the container door. The reinforcing element and/or the webs have a holding plate formed integral with the reinforcing element and/or the webs for fastening a locking mechanism. The reinforcing element preferably has hinged folds extending in parallel to the door edge and pointing toward the container in the pivot axis of the hinge. The fastening means is provided as a first fastening fold folded in parallel to the door edge and second fastening fold of the reinforcing element or the web, folded toward the container door. A first adhesive layer is preferably provided between the door edge and the first fastening fold and a second adhesive layer is provided between the container door and the second fastening fold. At least the second fastening fold is preferably in contact with the flat surface of the container door and is provided with spacer knobs for the second adhesive layer.

It is advantageous to provide the reinforcing element with individual rectangular, profile-like webs, which connect the door edges and have fastening means at the container door. The webs may extend either diagonally within the container door or in parallel to the door edge, or they may also be connected to one another in a framework-like pattern.

It is advantageous to make the holding plate, to which the locking mechanism for locking the container door is attached, in one piece with the reinforcing element and/or the webs. The holding plate is usually located opposite the hinge of the container door. The advantage of the one-piece design is essentially the fact that the holding plate can be inserted into the container door together with the reinforcing element and the webs, after which the holding plate, the reinforcing element, and the webs can be connected to the door edge or the flat surface of the container door in one operation.

Hinge folds, which serve to reinforce the hinge of the container door, are arranged on the reinforcing element preferably in the pivot axis of the hinge, extending in parallel to the door edge. As a result, a hinge-like gap, into which a corresponding counterpiece of the container, a container hinge fold, can extend, is formed between the hinge fold and the door edge. The rotating function of the hinge is achieved with a pin passing through the door edge, the container fold, and the hinge fold.

The fastening means of tile reinforcing element is designed as a first fastening fold folded toward the door edge, with a first adhesive layer between the first fastening fold and the door edge and with a second fastening fold, in parallel to the flat surface of the container door with a second adhesive layer between the second fastening fold and the container door. An epoxy resin adhesive is suitable as the adhesive layer. Second fastening folds are also provided at the webs and the holding plate. By varying the width of the fastening folds, the container door can be additionally reinforced.

To achieve uniform thickness of the adhesive layer, it is advantageous to provide at least the fastening folds which are in contact with the flat surface of the container door with spacing knobs similar to washers. The spacing knobs are dispensable in the area of the door edge, because the reinforcing element can be manufactured with a dimension smaller than specified in this area, as a result of which an all-around bonding gap is obtained between the door edge and the first reinforcing fold.

Is it a further objection of the invention to provide an oxygen supply unit housing with a pivotable container door which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
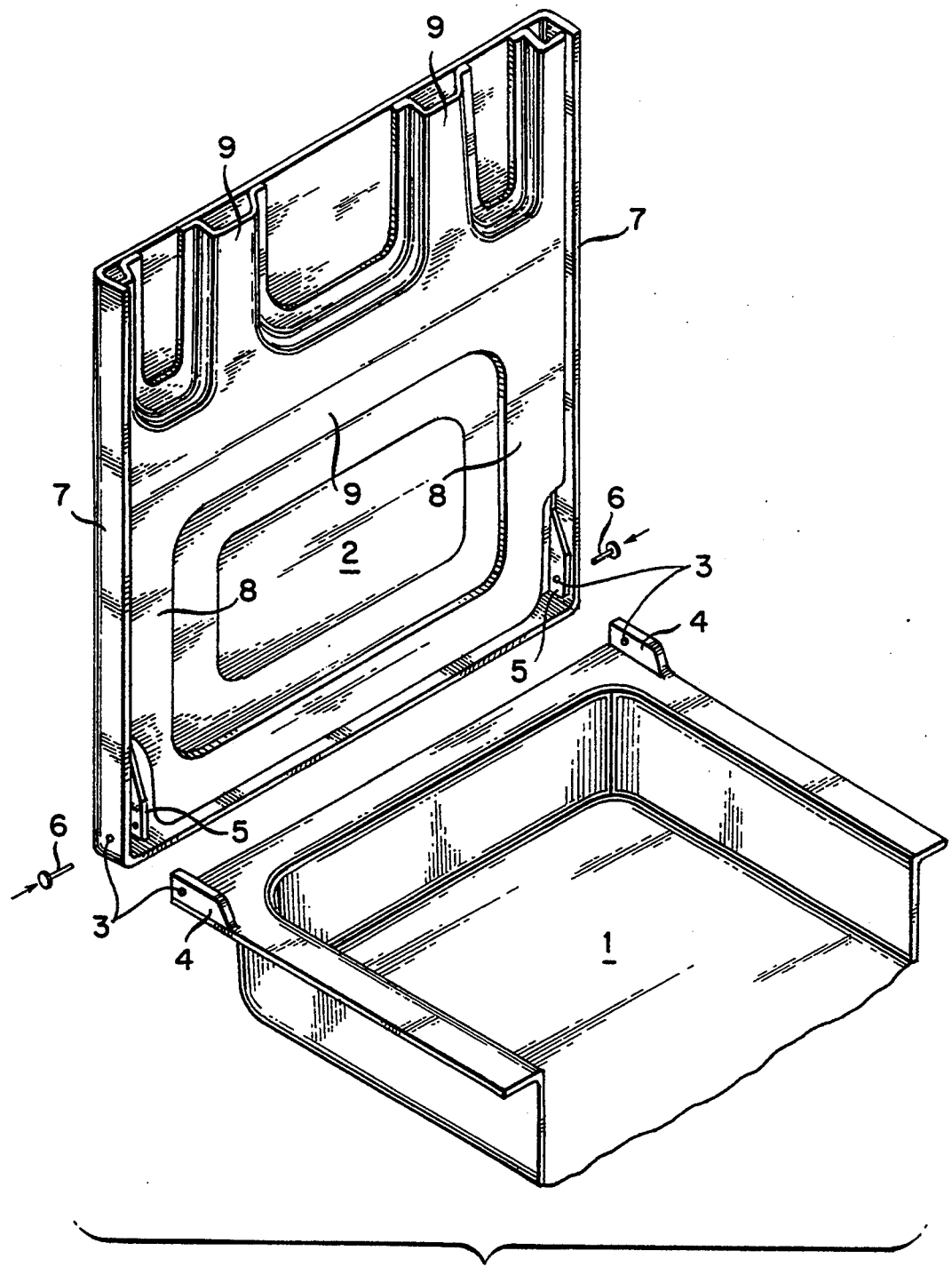
FIG. 1 is a perspective view of a container for an oxygen supply unit with a container door.

FIG. 1 shows a container 1 for an oxygen supply unit, not shown in FIG. 1, with a folded-up container door 2, which is pivotable around a hinge 3. The hinge 3 is shown in the disassembled state. It consists of two container folds 4 with holes in them on the container 1, which folds engage hinge folds 5 in the container door 2, which also have holes in them and have the same design. The container door 2 has, on its inner side, a box-like door edge 7 extending around the container door 2, which door edge 7 is in contact with the container 1 when the container door 2 is closed and has a through hole in the area of the hinge folds 5. The container folds 4 are located in the intermediate space between the door edge 7 and the hinge fold 5 and are connected to a pin 6 passing through them.

The inner side of the container door 2 is provided with a profile-like reinforcing element 8 extending around the door edge 7, with likewise profile-like webs 9 extending at right angles to the door edges 7.

Figure 2:
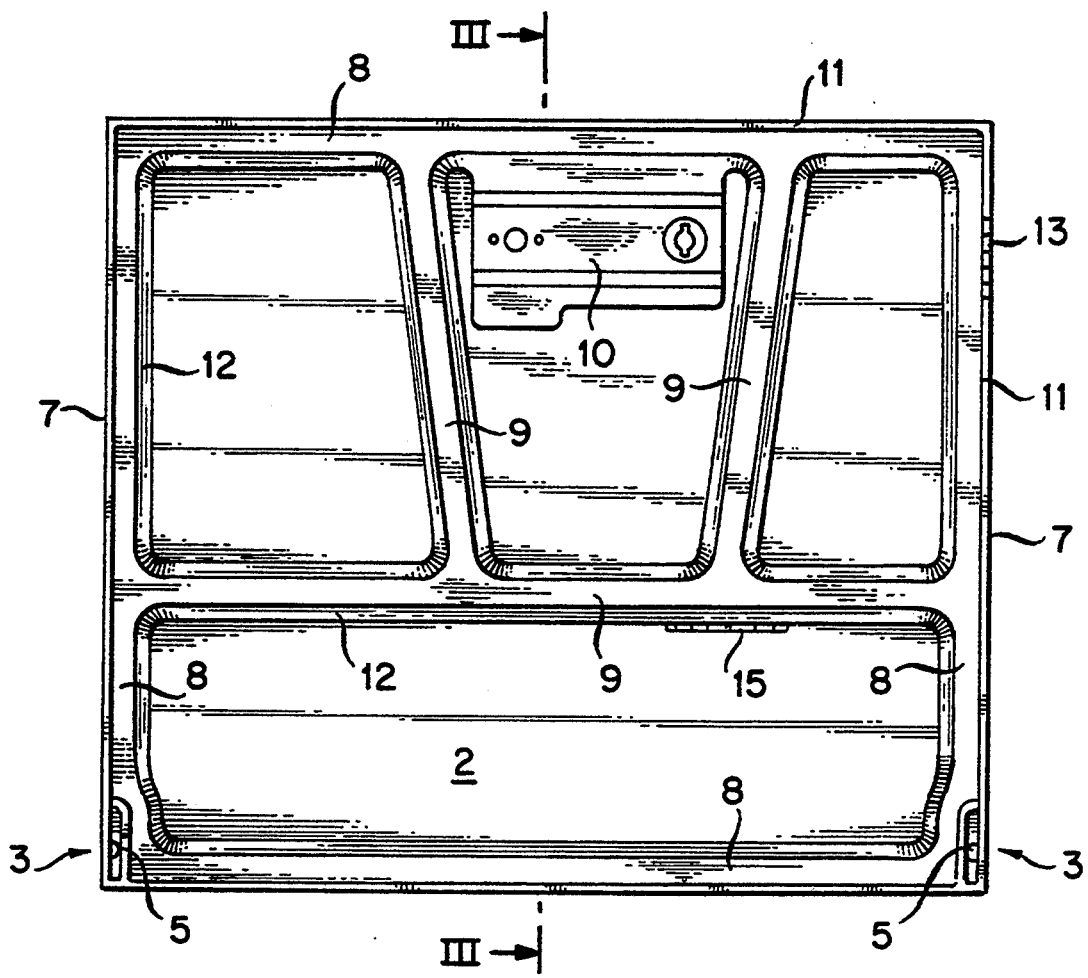
FIG. 2 is a top view of the inner side of the container door according to FIG. 1.
Figure 3:
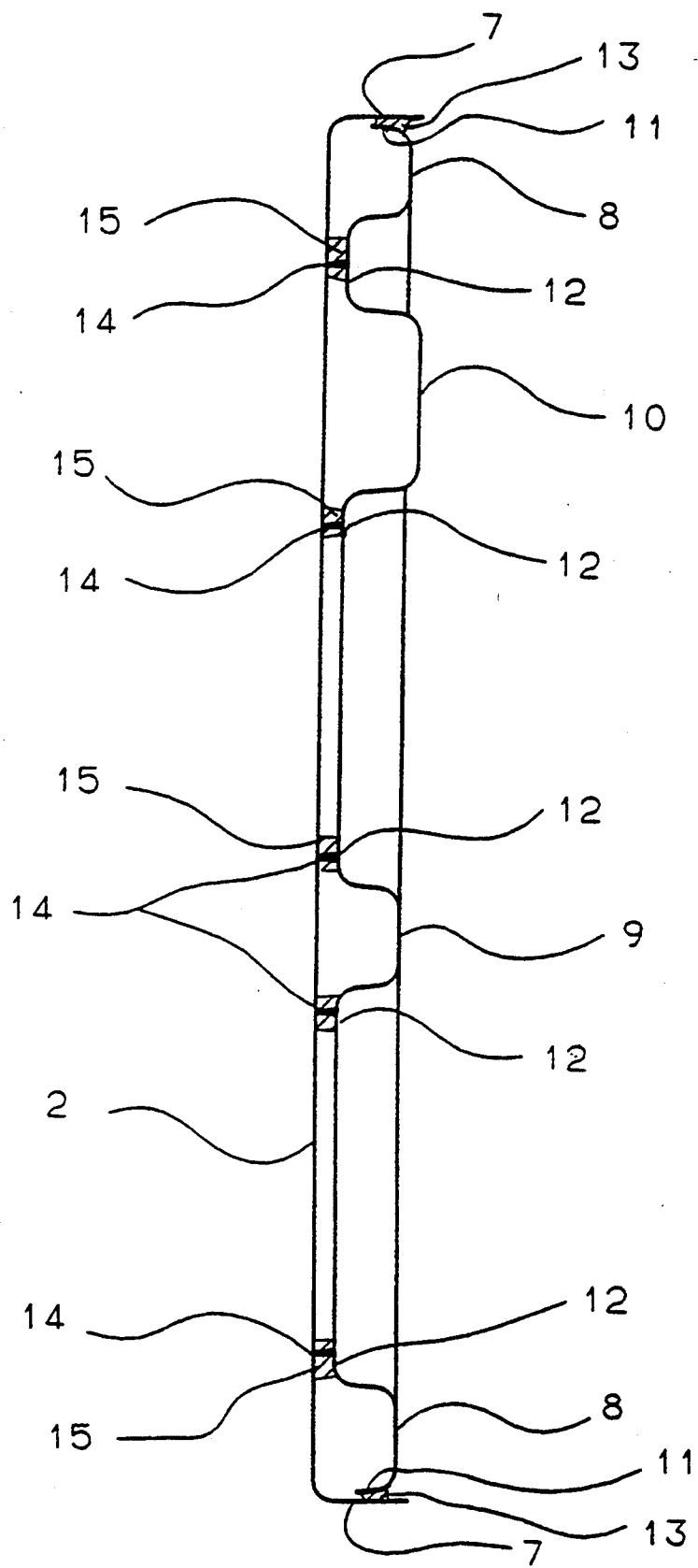
FIG. 3 is a sectional view along line A–B of the container door according to FIG. 2.

FIG. 2 shows a top view of the inner side of the container door 2. Identical components are designated by the same reference numerals as in FIG. 1. On the side of the container door 2 located opposite the hinge 3, a holding plate 10, which serves to fasten a locking mechanism, not shown, for the container door 2, is made in one piece with the reinforcing element 8. The hinge folds 5 are also made in one piece with the reinforcing element 8. FIG. 3 shows the section A–B through the container door 2 according to FIG. 2. Identical components are designated by the same reference numerals as in FIGS. 1 and 2. To attach the reinforcing element 8 with the profile-like webs 9 and the holding plate 10 to the container door 2, first fastening folds 11 forming part of the fastening means, which extend in parallel to the door edge 7 and form a gap for a first adhesive layer 13 forming part of the fastening means, are provided on the reinforcing element 8 in the area of the door edge 7. In the area of the flat surface of the container door 2, the reinforcing element 8, the holding plate 10, and the webs 9 have second fastening folds 12 forming part of the fastening means, which extend in parallel to the flat surface of the container door 2, rest on the container door via spacing knobs 14, and have a second adhesive layer 15 forming part of the fastening means. The adhesive layers 13, 15 are also recognizable in FIG. 2, but only parts of these layers have been drawn for clarity's sake. For example, an epoxy resin adhesive is suitable for use as the adhesive. Uniform distribution of the adhesive is achieved by means of the spacing knobs 14. Due to the reinforcing element 8, an all-around rectangular hollow profile, which reinforces the container door 2, is formed in the area of the door edge 7. Together with the flat surface of the container door 2, the webs 9 also form a hollow profile, as a result of which rigidity is further improved. The reinforcing elements 8 with the webs 9, with the holding plate 10, and with the hinge folds 5 together form a one-piece insert part, which is bonded to the container door 2 or the door edge 7 in one operation.

While a specific embodiment of the invention has been shown and described in detail to illustrate the application of the principles of the invention, it will be understood that the invention may be embodied otherwise without departing from such principles.

What is claimed is:

1. An aircraft oxygen supply unit housing container and container door, comprising:

a door member pivotable around a hinge for closing the oxygen supply unit housing, said door member including a container door flat surface connected to a door edge, said door edge extending in the direction of the container;

a reinforcing element extending adjacent said door edge and extending above said container and container door; and fastening means for fastening said profile-like reinforcing element to said container and container door and said door edge, said reinforcing element including individual rectangular webs which connect spaced apart portions of said door edge, said fastening means including a first fastening fold folded in parallel to said door edge and a second fastening fold extending from said reinforcing element toward said flat surface of said container door, a first adhesive layer being provided between said door edge and said first fastening fold and a second adhesive layer being provided between said flat surface of said container door and said second fastening fold, said reinforcing element and said first fastening fold forming together with the door edge a rectangular hollow profile.

2. A container door according to claim 1, wherein:
said reinforcing element includes a holding plate formed integrally therewith, said holding plate for connection with a locking mechanism for support thereof.

3. A container door according to claim 1, wherein:
said reinforcing element includes hinge folds extending in parallel to said door edge fold and pointing toward said container providing a hinged pivoting axis.

4. A container door according to claim 1, wherein:
said second fastening fold is connected with said container door via spacing knobs for application of said second adhesive layer between said second fastening fold and said container door.

5. A container door according to claim 1, wherein:
said reinforcing element includes webs traversing at least a portion of a space between opposite door edges, said webs including a fastening fold wherein an adhesive layer is provided between said fastening fold and said container door.

6. A container door according to claim 1, wherein:
said reinforcing element includes a fastening fold extending in parallel to said door edge, and adhesive layer being provided between said door edge and said fastening fold.

7. An aircraft oxygen supply unit housing container door, comprising:
a door member pivotable around a hinge for closing the oxygen supply unit housing, said door member including a container door flat surface connected to a door edge, said door edge extending in the direction of the container;
a reinforcing element extending adjacent to said door edge and extending above said container door; and
fastening means for fastening said reinforcing element to said container door and said door edge fold, said reinforcing element including individual rectangular webs which connect spaced apart portions of said door edge, said fastening means including a first fastening fold folded in parallel to said door edge and a second fastening fold extending from said reinforcing element toward said flat surface of said container door, a first adhesive layer being provided between said door edge and said first fastening fold, and a second adhesive layer being provided between said container door and said second fastening fold, said reinforcing element and said first fastening fold forming together with the door edge a rectangular hollow profile, said reinforcing element including hinge folds extending in parallel to said door edge and pointing toward said container providing a hinged pivoting axis.

8. An aircraft oxygen supply unit housing container door, comprising:
a door member pivotable around a hinge for closing the oxygen supply unit housing, said door member including a container door flat surface connected to a door edge, said door edge extending in the direction of the container;
a reinforcing element extending adjacent said door edge and extending above said container door; and
fastening means for fastening said profile-like reinforcing element to said container door and said door edge, said reinforcing element including individual rectangular webs which connect spaced apart portions of said door edge, said fastening means including a first fastening fold folded in parallel to said door edge and a second fastening fold extending from said reinforcing element toward said flat surface of said container door, a first adhesive layer being provided between said door edge and said first fastening fold, and a second adhesive layer being provided between said flat surface of said container door and said second fastening fold, said reinforcing element and said first fastening fold forming together with the door edge a rectangular hollow profile, said reinforcing element including hinge folds extending in parallel to said door edge fold and pointing toward said container providing a hinged pivoting axis, said reinforcing element further including a holding plate formed integrally therewith, said holding plate for supporting said locking mechanism.

* * * * *